United States Patent [19]

Naab et al.

[11] 4,307,858
[45] Dec. 29, 1981

[54] CANOPY RELEASE MECHANISM

[75] Inventors: Carlton W. Naab, Williamsville;
Roman Jankowiak, Cheektowaga,
both of N.Y.

[73] Assignee: Conax Corporation, Buffalo, N.Y.

[21] Appl. No.: 93,142

[22] Filed: Nov. 9, 1979

[51] Int. Cl.³ .............................................. B64D 17/30
[52] U.S. Cl. .............................. 244/151 B; 24/201 R;
24/230 A; 294/83 A
[58] Field of Search ........... 244/151 R, 151 A, 151 B,
244/122 AE, 122 AF, 122 B; 294/83 A, 83 AE,
83 AB; 9/318; 24/73 PH, 201 R, 201 A, 230 R,
230 A, 230 BC, 230 AS, 265 B

[56] References Cited

U.S. PATENT DOCUMENTS

| | | | |
|---|---|---|---|
| 3,624,813 | 11/1971 | Gaylord | 244/151 A |
| 3,845,525 | 11/1974 | Gaylord | 24/230 R |
| 3,872,556 | 3/1975 | Frost | 244/151 B |
| 4,023,846 | 5/1977 | Poehlmann | 244/151 B |
| 4,024,440 | 5/1977 | Miller | 9/318 |
| 4,086,685 | 5/1978 | Gaylord | 244/151 B |

*Primary Examiner*—Charles E. Frankfort
*Attorney, Agent, or Firm*—Christel, Bean & Linihan

[57] ABSTRACT

A water-activated canopy release mechanism having a detachable sleeve positioned between the arms of a buckle yoke. The sleeve contains a longitudinal passage having a release piston and bushing positioned therein and supporting the sleeve within the yoke. An explosive cartridge mounted at the piston end is fired by a sensor activated by water of predetermined conductivity and drives the release piston completely into the sleeve and wedges it there, thus freeing the end of the sleeve adjacent the cartridge. Simultaneously, the piston drives the bushing out of the other end of the sleeve and against a wedge carried by the yoke arm. As a result, both the piston and the bushing are held in a position which permits the sleeve to drop free of the yoke releasing the canopy from its load.

15 Claims, 4 Drawing Figures

CANOPY RELEASE MECHANISM

BACKGROUND OF THE INVENTION

1. Field of the Invention

This invention relates generally to release mechanisms wherein a sleeve is detached from a yoke upon receipt of a signal.

More specifically, this invention relates to a water-activated canopy release mechanism in which a sleeve is detached by explosive means from a buckle yoke upon contact with water.

A preferred embodiment of this invention allows the retrofitting of standard parachute harness buckles with the detachable sleeve herein described.

2. Description of the Prior Art

The need for simple and highly reliable release mechanisms for uncoupling a parachute canopy from its load upon landing in water is well recognized. For example, a pilot who has been forced to bail out of his aircraft is sometimes injured and often is unconscious as he enters the water. If he is unable to manually release the canopy, he is in grave danger of drowning as the canopy tends to drag him through the water or settles over him.

A number of arrangements of release mechanisms have been proposed to automatically uncouple a canopy from its load upon landing in water. U.S. Pat. No. 3,632,066 discloses a parachute harness release mechanism which employs electrochemical cells actuated by water to provide thermal energy for burning through harness control straps and to operate a pneumatic release mechanism for automatically opening harness buckles thus freeing the wearer from the canopy.

U.S. Pat. No. 3,774,870 discloses a parachute release mechanism which is either water-activated or manually operable upon reaching water. The water-activated release or latch is squib-operated and placed in series with the manual latch.

A water-activated, quick release connector is disclosed in U.S. Pat. No. 4,050,122. A power source is activated by a remote signal causing a piston to operate through a rotatable driving member to rotate a shaft and release the connector fittings.

U.S. Pat. No. 3,872,556 discloses a quick disconnect coupling for parachutes and related equipment which is gas-operated but not water-activated. The coupling includes a piston which, when activated by gas pressure, causes a shuttle trunnion and a slide block to be repositioned in alignment with the joints in a tongue and notch combination thereby freeing the tongue from the notch.

U.S. Pat. No. 4,023,846 discloses a water-activated, canopy release coupling in which the male and female members of the coupling define a common locking passageway oriented transversely through their engaged portions. A two-element bolt is disposed in the passageway and is adapted to move from a locking position to a releasing position.

Although many of the prior release mechanisms operate in a generally satisfactory manner, there exists the need for a mechanism which disengages in a positive fashion, is of rugged and simple mechanical construction and can be conveniently retrofitted to existing canopy assemblies, without reworking.

SUMMARY OF THE INVENTION

A water-activated canopy release mechanism easily adapted for retrofitting to existing canopy assemblies comprises a sleeve positioned between the arms of a buckle yoke and detachable therefrom by the firing of an explosive cartridge which is activated by contact with water of predetermined conductivity. The sleeve is provided with an axial passage having different diameter portions. Disposed within the passage is a release piston and a bushing, each adapted for limited axial travel upon firing of the cartridge so as to wedge into a position permitting the sleeve to separate from the buckle yoke.

Hence, it is an object of this invention to provide a simple, reliable mechanism for releasing a sleeve from a yoke.

Another object of this invention is to provide such a canopy release mechanism activated by contact with water of relatively high conductivity.

A specific object of this invention is to provide the foregoing in a canopy release mechanism easily retrofitted to existing canopy assemblies, without reworking.

DESCRIPTION OF THE PREFERRED EMBODIMENT

Figure 1:
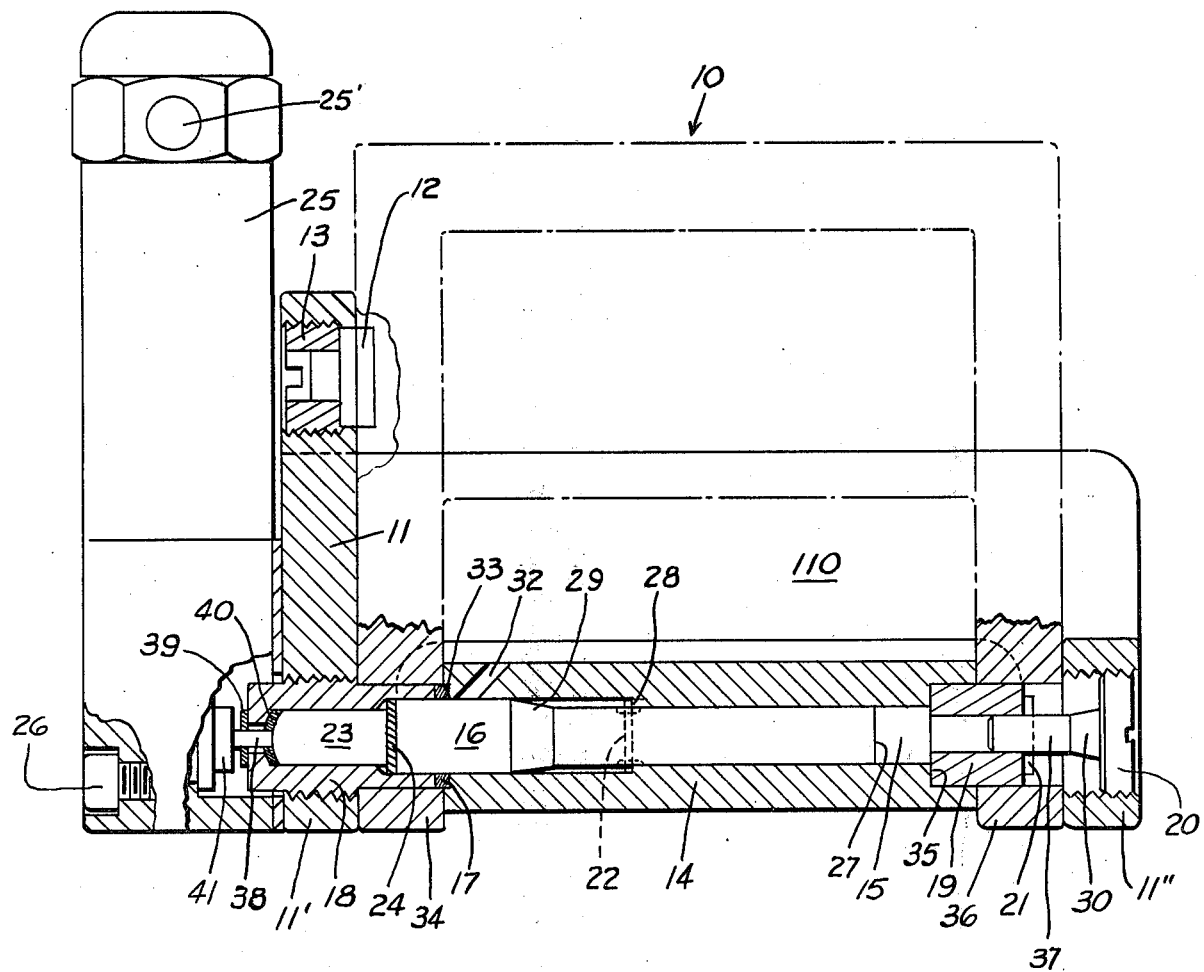
FIG. 1 is a partial sectional view of the release mechanism in an engaged position, the canopy release body being shown partly in section and partly in phantom outline.

Referring to the drawing where like reference numerals refer to similar parts throughout the figures, there is shown in FIG. 1 a partial sectional view of the release mechanism as mounted in a conventional canopy assembly.

In this embodiment, the locking bar buckle half or body 10 of a conventional canopy release assembly is shown in outline in FIG. 1, except those portions receiving the release mechanism which portions are shown in section. Assembly 10 is retrofitted with the release mechanism of this invention by removing the existing pin, sleeve and retaining screw and attaching adapter plate 11 to the buckle frame by means of locking disc 12 and disc plug 13. In place of the conventional sleeve there is provided a releasing sleeve 14 having a stepped longitudinal bore 15 providing a shoulder 28. A release piston 16 is positioned in the sleeve bore 15 and normally extends through an O-ring 17 seated in the recessed end 33 of sleeve 14, beyond the sleeve and into the bore of cartridge plug 18. Plug 18 is threaded in one arm 11' of adaptor 11 and extends into the opening through one arm 34 of the buckle yoke to receive the piston end. The opposite end of sleeve 14 is held in place by bushing 19 which is seated in the more deeply recessed end 35 of sleeve 14 and extends into the opening through the other arm 36 of the buckle yoke.

Bushing 19 is adapted to slide axially outward about stem 37 of bushing plug 20, and is restrained against such movement in the engaged position of FIG. 1 by bushing shear pin 21 extending through stem 37. Likewise, release piston 16 is restrained in an engaged position by piston shear pin 22 extending through piston 16 and abutting shoulder 28. The enlarged head of plug 20 is threaded into an opening through the other arm 11" of adaptor 11. Arms 11' and 11" of adaptor plate 11 are joined by a web 110 spanning the canopy release body 10. With the parts in the illustrated position, sleeve 14 functions in the same manner as the existing sleeve of a conventional locking bar. A cartridge 23 is mounted in plug 18 and a ground contact disc 24 is positioned between one end of the cartridge and the adjacent face of piston 16. Cartridge 23 is adapted to be fired by sensor 25 which is attached to adapter plate 11 by means of mounting screws 26. Cartridge 23 includes an electrically conductive contact pin 38 extending through a reduced diameter opening through the adjacent end wall of plug 18, insulating washer 39 and "O" ring 40 shielding the pin relative to the plug, and mated with an electrically conductive contact socket 41 in sensor 25, so designed that it will not fire until it contacts water of a predetermined conductivity, thereby distinguishing salt water from natural rain water and preventing the inadvertent release of the canopy during descent.

Sensor 25 has access holes 25', for entry of water, and can be of any suitable type and construction, such as that shown in commonly assigned U.S. Pat. No. 4,024,440, the disclosure of which is incorporated herein by reference. Briefly summarizing the operation of the sensor, when water of predetermined conductivity fills the space between a sensing probe and the sensor body a circuit is closed thereby triggering a firing current which detonates cartridge 23. Such sensors being known in the art, further description is believed unnecessary.

The release mechanism of this invention remains in the engaged position shown in the drawings so long as the sensor 25 is either dry or is in contact with the low conductivity water (e.g. 2,500 micro-siemens max) such as rain. Upon contact with saline waters of higher conductivity, for example 16,750 microsiemens or above, the sensor 25 fires cartridge 23. The resulting force acting against the face of piston 16 shears pin 22 and drives release piston 16 to the right, as seen in FIG. 1, displacing piston 16 from plug 18 and yoke arm 34 to a point within sleeve 14, thereby releasing the piston end of sleeve 14 from the buckle frame. After a short distance of axial travel, piston end 27 strikes the end of bushing 19, shearing pin 21 and driving bushing 19 to the right as seen in FIG. 1 out of sleeve 14 thereby freeing the bushing end of sleeve 14 from the buckle frame. Sleeve 14 then drops free of the buckle yoke, releasing the load from the canopy. Spent explosive gases are released from bore 15 throughport 32 which is uncovered by piston movement.

Longitudinal bore 15 of sleeve 14 is of stepped diameter having the shoulder 28 which forms a stop for piston shear pin 22. Piston 16 has a tapered portion 29 intermediate its ends which limits its axial travel by engagement with shoulder 28. Taper 29 and shoulder 28 are positioned relative to each other to allow the piston to be displaced from yoke arm 34 into sleeve 14 while preventing movement of piston 16 beyond the bushing end of sleeve 14. The length of piston 16 is less than the length of sleeve 14, being dimensioned so that piston end 27 drives bushing 19 from sleeve 14 but does not extend beyond the sleeve end upon activation. Engagement of taper 29 with shoulder 28 wedges piston 16 in place within sleeve 14 at the end of its travel, precluding any possibility of piston rebound to interfere with release of sleeve 14 from the buckle frame.

Bushing plug 20 is also provided with an expanding tapered portion 30 adjacent its head end. As bushing 19 is driven by piston 16 from sleeve 14 further into arm 36 it wedges upon taper 30 of plug 20 at the end of its travel. The length of bushing 19 and the position of taper 30 are such that the piston end of bushing 19 is completely free of sleeve 14 and recessed into the buckle frame as the bushing is wedged upon the taper. In this way, the bushing is held in place at the end of its travel, precluding any rebound to interfere with release of sleeve 14 from the frame.

Figure 3:
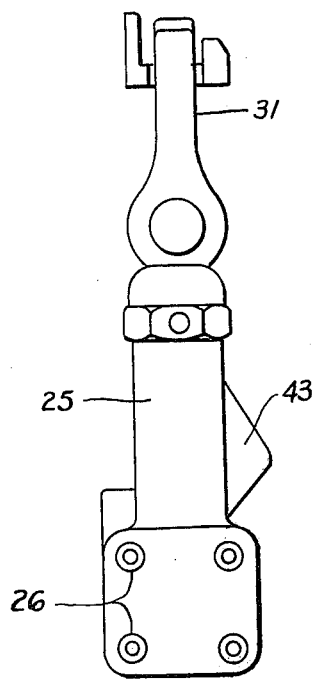
FIG. 3 is a side view of FIG. 2.
Figure 2:
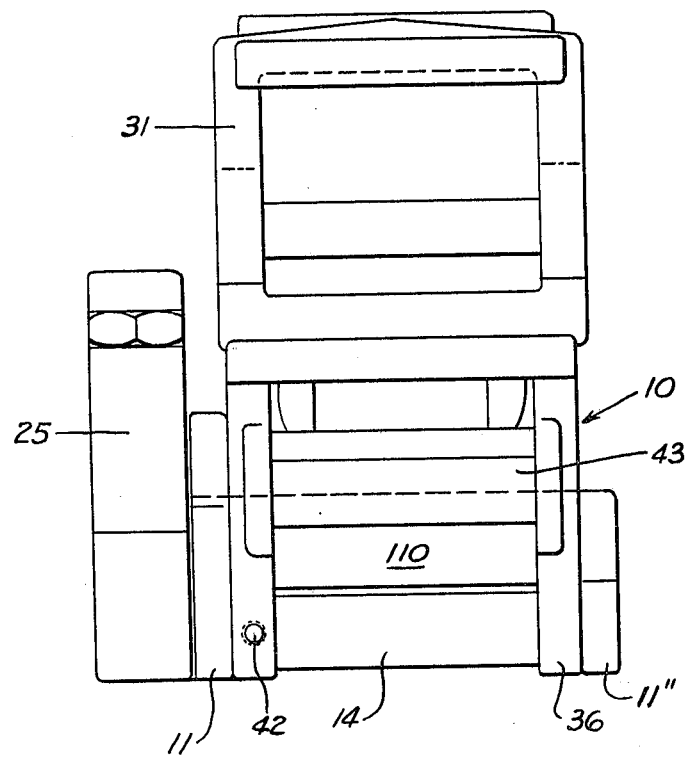
FIG. 2 is an assembled view, in elevation, showing the release mechanism fitted to a standard canopy release assembly.
Figure 4:
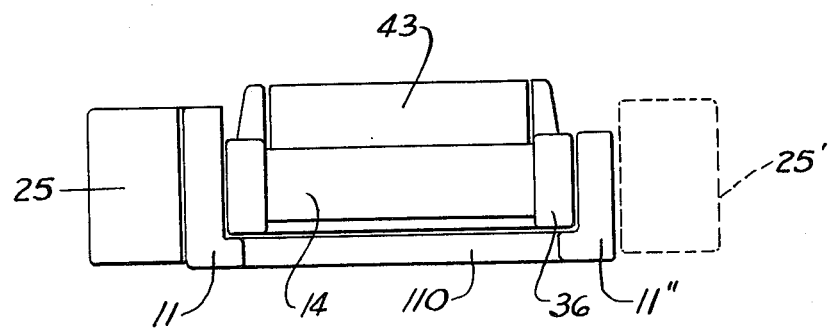
FIG. 4 is an end view illustrating the reversibility of the assembly for either left side or right side mounting.

FIGS. 2-4 illustrate the canopy release mechanism of this invention as retrofitted to an existing, or standard, canopy release assembly. The canopy assembly comprises canopy adjuster 31 which is coupled to the buckle half or canopy release body 10 under control of a double acting manually operable latch mechanism 42, for example of the type shown in U.S. Pat. No. 3,183,568. As before described, the detachable sleeve 14 of this invention replaces the existing pin, sleeve and retaining screw, not shown, of the usual canopy assembly, the pin being removed from its tapped opening 42. Upon removal of the pin and retaining screw, the existing sleeve drops out and the release mechanism of this invention is installed as previously described. The retrofit assembly is readily accomplished, and it is a particular feature of this invention that no reworking of the existing buckle half is required—merely the removal of the existing sleeve. The novel release mechanism is uncomplicated and extremely dependable, and is adapted for either right side or left side mounting. Sensor 25 may be mounted on the left side as illustrated in the drawings or may be mounted on the right side in the position 25' shown in phantom in FIG. 4.

It will be understood by those skilled in the art that a webbing strap, not shown, is secured to sleeve 14 which extends through an eye in the strap. Also, the canopy release mechanism is shown inverted from its normal position in use, although it will function as described in any position of use.

While one preferred embodiment of the invention is for retrofitting use with conventional canopy assemblies as described, its utility is not so limited. Rather, the release mechanism of this invention may be utilized in any circumstances where it is desired to release a sleeve from a yoke upon the generation of a signal from a sensor or other source.

We claim:

1. A detachable sleeve positioned within a yoke, said sleeve provided with a central bore having disposed therein a piston adapted for limited axial travel and bridging the junction between one end of the sleeve and the yoke, shear pin means releasably retaining said piston in its bridging position, a bushing positioned in said bore also adapted for limited axial travel and bridging the junction with the yoke at the other end of said sleeve, the facing ends of said piston and bushing being spaced apart within said sleeve, explosive means adapted to drive said piston out of its bridging position into said sleeve toward said bushing to in turn drive said bushing out of said sleeve and thereby release said sleeve from the yoke, means trapping said piston within said sleeve, and sensing means adapted to activate said explosive means.

2. The detachable sleeve of claim 1 wherein said piston is driven into a wedged position within said sleeve, limiting its axial travel in one direction and preventing rebound, and wherein said bushing is driven into wedging engagement within said yoke.

3. The detachable sleeve of claim 2 wherein said central bore is of stepped diameter to form a shoulder between a larger diameter portion and a smaller diameter portion, and wherein said piston is provided with a tapered portion intermediate the ends thereof, said tapered portion positioned so as to limit axial travel of the piston by wedging upon said shoulder.

4. The detachable sleeve of claim 3 wherein said shear pin is carried by said piston and positioned so as to utilize said shoulder as a stop.

5. The detachable sleeve of claim 3, together with a plug upon which said bushing is axially slidable, said plug having an expanding taper positioned adjacent one end to limit axial travel of said bushing by wedging upon said taper.

6. The detachable sleeve of claim 5 wherein said bushing is held in bridging position by shear pin means carried on said plug.

7. The detachable sleeve of claim 5 wherein said sensing means activate said explosive means upon contact with water of predetermined conductivity.

8. The detachable sleeve of claim 5 wherein said yoke comprises the buckle of a canopy assembly.

9. The detachable sleeve of claim 8 further comprising an adapter plate for attaching said sensing means and sleeve to a canopy assembly.

10. The detachable sleeve of claim 9, together with a cartridge plug carried by said adapter plate and extending into an arm of the yoke, said piston extending into said cartridge plug.

11. A canopy release mechanism comprising a release body having a yoke, a detachable sleeve positioned within said yoke, said sleeve being provied with a central bore, a piston disposed in said bore and adapted for limited axial travel therein, said piston bridging the junction between one end of said sleeve and said yoke, means releasably retaining said piston in its bridging position, a bushing positioned in said bore and bridging the junction with said yoke at the other end of said sleeve, means releasably retaining said bushing in its bridging position, the facing ends of said piston and bushing being spaced apart within said sleeve, explosive means adapted to drive said piston out of its bridging position into said sleeve toward said bushing to in turn drive said bushing out of said sleeve and means trapping said piston within said sleeve, thereby releasing said sleeve from said yoke, said sleeve being adapted to receive a strap released from said yoke upon release of said sleeve, and sensing means adapted to activate said explosive means.

12. A canopy release mechanism as set forth in claim 11, said yoke having a pair of arms receiving said sleeve therebetween, an adaptor secured to said release body and having a pair of arms, said adaptor spanning said yoke with said adaptor arms positioned exteriorly of said yoke arms, said sensor being carried by said adaptor, and said explosive means being carried by one of said adaptor means.

13. A canopy release mechanism as set forth in claim 12, said explosive means comprising a cartridge plug carried by said one adaptor arm and extending into the adjacent arm of said yoke, said piston extending into said cartridge plug when in its bridging position.

14. A canopy release mechanism as set forth in claim 12 or claim 13, together with a plug carried by the other adaptor arm and having a stem extending into the adjacent arm of said yoke, said bushing extending into the arm of said yoke adjacent said other adaptor arm when in its bridging position and being slidable on said stem out of its bridging position.

15. A canopy release mechanism as set forth in claim 14, said plug having an expanding taper upon which said bushing wedges to retain said bushing out of said sleeve.

* * * * *